United States Patent
Vazin

(10) Patent No.: US 10,618,721 B2
(45) Date of Patent: Apr. 14, 2020

(54) CONTAINER WITH ENCIRCLING GRAPHIC AND PROCESS FOR PRODUCING

(71) Applicant: AMERICAN MADE PLASTIC INC, Riverside, CA (US)

(72) Inventor: Moe Vazin, Riverside, CA (US)

(73) Assignee: American Made Plastic Inc., Riverside, CA (US)

( * ) Notice: Subject to any disclaimer, the term of this patent is extended or adjusted under 35 U.S.C. 154(b) by 54 days.

(21) Appl. No.: 15/496,981

(22) Filed: Apr. 25, 2017

(65) Prior Publication Data

US 2018/0305110 A1    Oct. 25, 2018

(51) Int. Cl.
| | |
|---|---|
| *B65D 25/10* | (2006.01) |
| *B65D 81/38* | (2006.01) |
| *B29C 41/50* | (2006.01) |
| *B65D 25/20* | (2006.01) |
| *B32B 27/32* | (2006.01) |
| *B65D 23/08* | (2006.01) |
| *B65D 23/10* | (2006.01) |
| *B65D 25/36* | (2006.01) |
| *B65D 25/28* | (2006.01) |

(52) U.S. Cl.
CPC .......... *B65D 81/3876* (2013.01); *B29C 41/50* (2013.01); *B32B 27/32* (2013.01); *B65D 23/0864* (2013.01); *B65D 23/104* (2013.01); *B65D 25/20* (2013.01); *B65D 25/2805* (2013.01); *B65D 25/36* (2013.01); *B65D 2203/02* (2013.01)

(58) Field of Classification Search
USPC ............. 399/262; 220/710.5, 752, 759
See application file for complete search history.

(56) References Cited

U.S. PATENT DOCUMENTS

| | | | | |
|---|---|---|---|---|
| 128,810 | A * | 7/1872 | Parker ............. | B67D 3/0009 222/131 |
| 1,802,509 | A * | 4/1931 | Hillyard ........... | B65D 7/04 222/463 |
| 2,208,478 | A * | 7/1940 | Simons ............ | A47G 23/0216 294/33 |
| 3,825,151 | A * | 7/1974 | Arnaud ............ | A47G 23/0216 220/710.5 |
| 4,095,090 | A * | 6/1978 | Pianezza ......... | A47G 19/2288 219/435 |
| 4,570,454 | A * | 2/1986 | Campbell ........ | A47G 19/2227 215/13.1 |
| 4,602,723 | A * | 7/1986 | DeMars ........... | A47G 23/0266 220/742 |
| 5,070,539 | A * | 12/1991 | Cheng ............. | A47G 19/2227 220/737 |
| 5,203,471 | A * | 4/1993 | Widman .......... | A47G 23/0266 220/755 |
| 5,400,907 | A * | 3/1995 | Chen ............... | A47G 19/2227 206/459.1 |

(Continued)

*Primary Examiner* — Rodney E Fuller
(74) *Attorney, Agent, or Firm* — Smyrski Law Group, A P.C.

(57) ABSTRACT

A process for producing a container is provided. The process includes fabricating a container body, providing a graphic about the periphery of the container body such that the graphic covers substantially all of the periphery of the container body, and fixedly mounting a handle to the container body after providing the graphic.

20 Claims, 8 Drawing Sheets

(56) References Cited

U.S. PATENT DOCUMENTS

| | | | | |
|---|---|---|---|---|
| 5,505,330 A * | 4/1996 | Nunes | A47G 23/0266 | 220/742 |
| 5,525,383 A * | 6/1996 | Witkowski | A47G 19/2227 | 206/217 |
| 5,894,948 A * | 4/1999 | Yeh | A47G 19/2227 | 215/12.1 |
| 6,140,614 A * | 10/2000 | Padamsee | A47J 36/2466 | 219/438 |
| 6,398,065 B1 * | 6/2002 | Lewis | A47G 19/2227 | 206/457 |
| 6,467,644 B1 * | 10/2002 | Yeh | A47G 19/2227 | 215/10 |
| 6,505,734 B2 * | 1/2003 | Su | A47G 19/2227 | 206/217 |
| 6,962,265 B1 * | 11/2005 | Zhang | A47G 19/22 | 220/754 |
| 7,243,816 B2 * | 7/2007 | Aochi | B65D 25/2811 | 220/264 |
| 8,608,019 B2 * | 12/2013 | Wren | A47G 23/0216 | 220/757 |
| 9,022,248 B2 * | 5/2015 | Vandenlangenberg | B65D 81/3876 | 220/592.16 |
| 9,661,945 B2 * | 5/2017 | DeNinno | A47G 19/2227 | |
| 2004/0159661 A1 * | 8/2004 | Aochi | B65D 25/2811 | 220/264 |
| 2005/0103794 A1 * | 5/2005 | Liu | A47G 19/22 | 220/703 |
| 2007/0194030 A1 * | 8/2007 | Bakti | A47G 19/2227 | 220/703 |
| 2008/0041865 A1 * | 2/2008 | Chen | B65D 25/205 | 220/759 |
| 2009/0173652 A1 * | 7/2009 | Chen | A47G 19/2227 | 206/457 |
| 2009/0183299 A1 * | 7/2009 | Conway | A44C 5/0007 | 2/170 |
| 2011/0139803 A1 * | 6/2011 | Leslie | A47G 23/0216 | 220/739 |
| 2013/0118042 A1 * | 5/2013 | Keys | G09F 3/00 | 40/299.01 |
| 2016/0022069 A1 * | 1/2016 | Martin | B65D 25/2811 | 206/459.5 |

* cited by examiner

US 10,618,721 B2

CONTAINER WITH ENCIRCLING GRAPHIC AND PROCESS FOR PRODUCING

BACKGROUND OF THE INVENTION

Field of the Invention

The present invention relates in general to the field of containers, and more specifically to containers used to pour liquids.

Description of the Related Art

Containers for liquids, such as jugs, pitchers, and the like frequently include handles. This includes cups, mugs, and other liquid containing devices used by consumers.

Past attempts to provide graphics with such devices have been limited to either providing a covering, such as a paint, enamel, or other application, or somehow altering the material from which the container is constructed, i.e. including reflective flecks in plastic before providing the plastic to a casting or mold and setting the plastic. Such containers may be constructed in multiple parts, such as a top part made of one color of ceramic topped by a different color of ceramic. Otherwise, once the cup and handle are formed, the product can be decorated by an external automated process, such as painting, spraying, dipping, etc., or by hand, such as hand painting on the product.

One difficulty with such a product is the presence of a handle. The presence of a handle partially obscures the underlying part of the container. It can be difficult to evenly distribute a covering when such a handle exists. One wishing to, for example, hand paint a design on the container under the handle must navigate around the handle, which can be time consuming Automated processes can have difficulty with even distribution of covering, e.g. paint, with paint building up in some areas and lightly distributed or completely missing in others due to the nonuniform shape of the finished container.

Certain types of containers may have graphics affixed thereto in the form of a sticker, decal, applique, or similar item. In the presence of a handle, the graphic is typically applied in a position away from and not directly beneath the handle. Certain graphics can be applied at various positions on the container, but it is difficult to apply such a graphic completely around the container due to the presence of the handle. Application of graphics in a uniform or completely encircling manner can be advantageous.

It would be highly beneficial for a container with handle to provide a graphic that goes around the container, including under the handle, and such a graphic could be easily applied to the container.

SUMMARY OF THE INVENTION

According to an embodiment of the present design, there is provided a process comprising fabricating a container body, providing a graphic about the periphery of the container body such that the graphic covers substantially all of the periphery of the container body, and fixedly mounting a handle to the container body after providing the graphic. In one aspect, fixedly mounting the handle to the container body comprises bonding at least one of a top portion of the handle and a bottom portion of the handle to the container body. The container body and handle may be formed of plastic. The container body may have a circular cross section through at least a portion of the container body. The graphic may cover over 95 percent of the periphery of the container body, and in one embodiment the container body comprises prongs configured to be received within holes in the handle and the handle is bonded to the container body using the prongs and holes. The container body may be formed with receiving elements configured to receive ends of the handle and in one embodiment may be configured to receive a plurality of handles.

According to another embodiment of the present design, there is provided a container produced by a process comprising fabricating a container body while simultaneously fastening a graphic about the periphery of the container body such that the graphic covers substantially all of the periphery of the container body, wherein the periphery comprises at least a portion of an exterior boundary of the container body, and fixedly mounting a handle to the container body after fastening the graphic.

According to a further embodiment of the present design, there is provided a process for producing a container comprising fabricating a container body having a circular cross section, fastening a graphic about the periphery of the container body such that the graphic covers over 95 percent of the periphery of the container body, and fixedly mounting a handle to the container body after fastening the graphic. The periphery of the container body comprises at least a portion of an exterior surface of the container body.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present invention includes a container, such as a plastic pitcher, having a handle and a graphic completely surrounding the pitcher, including under the handle of the pitcher. The same concept can be applied to various types of containers including handles, including but not limited to cups, mugs, jars with handles, and so forth. While described primarily with respect to containers with a single handle, multiple handles may be provided in the manner discussed.

Figure 1:
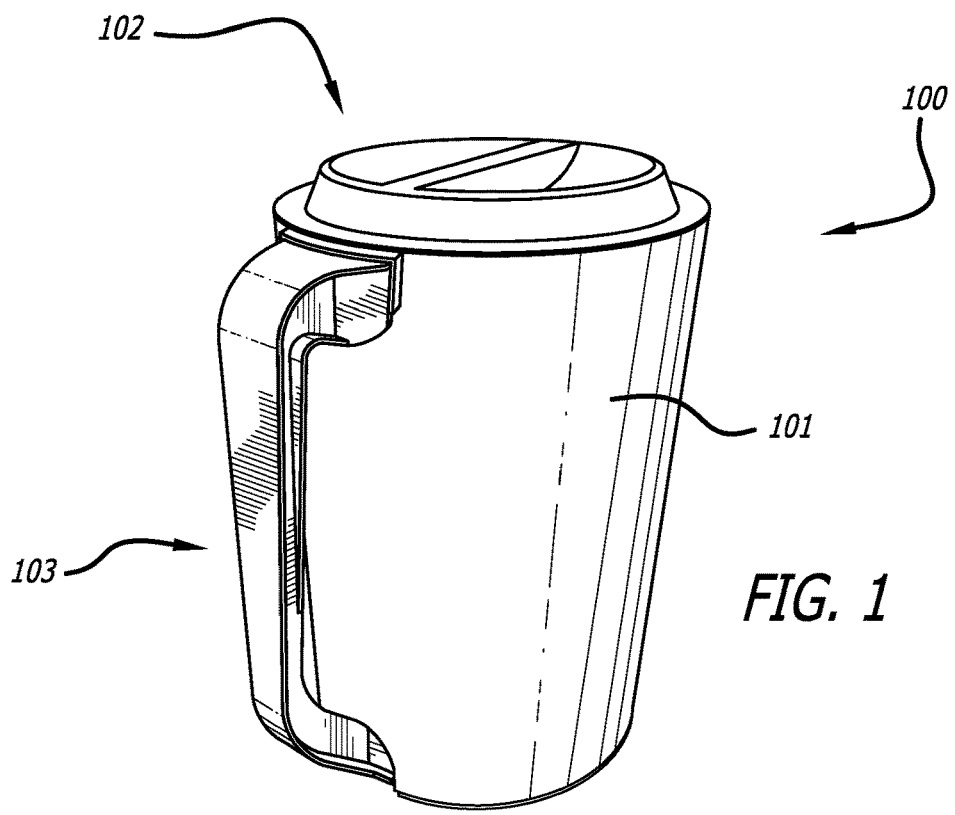
FIG. 1 is a rear perspective view of a container, from the top, according to the present design.
Figure 2:
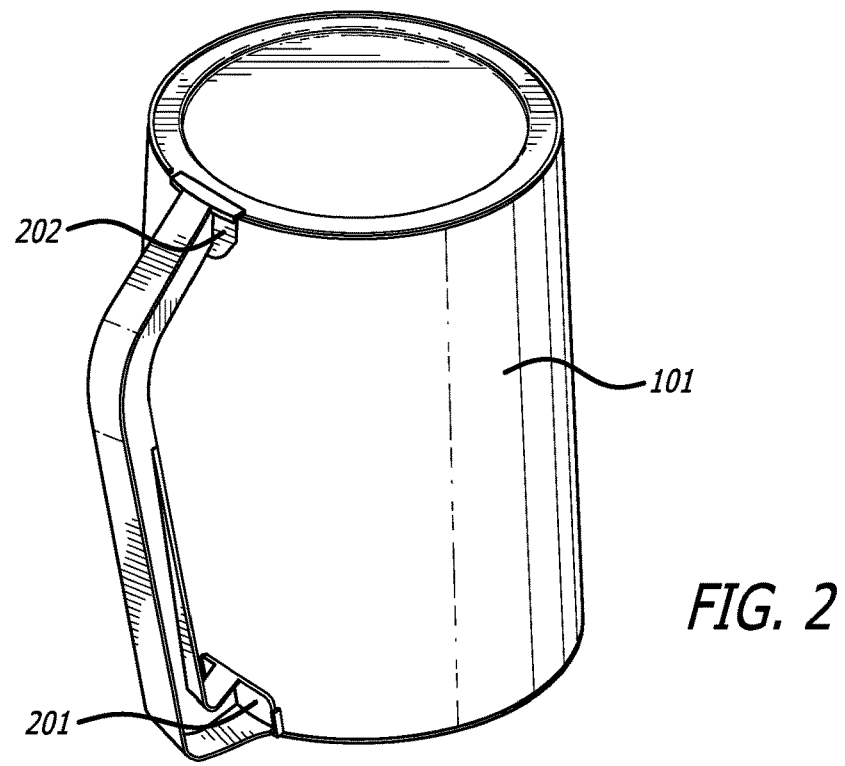
FIG. 2 is a rear perspective view of the container according to the present design from the bottom of the container.
Figure 3:
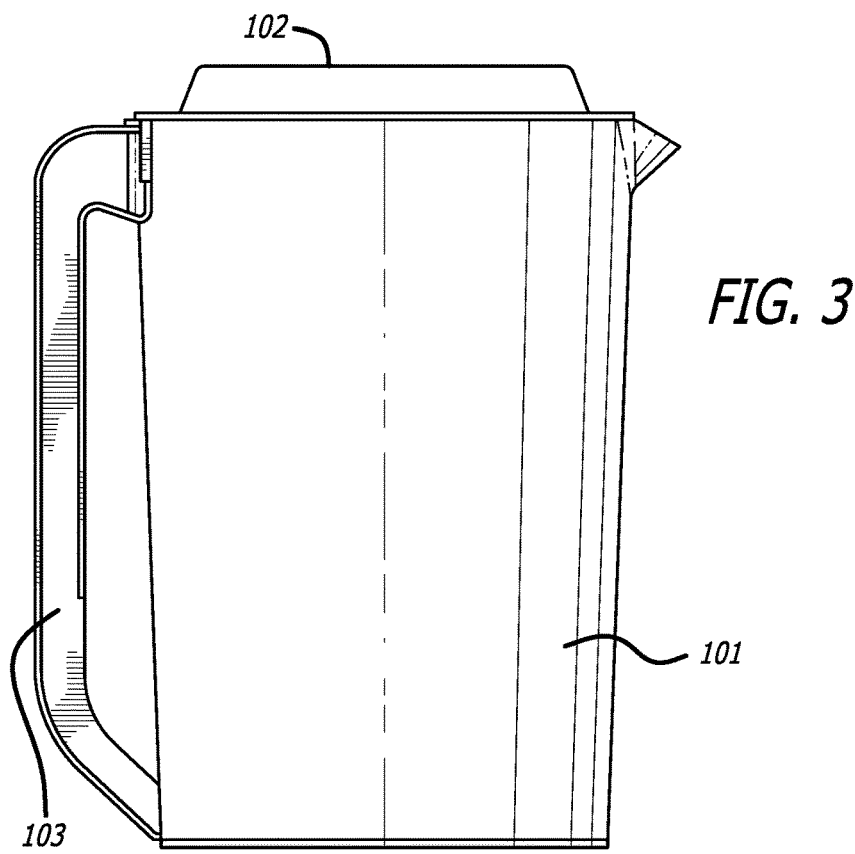
FIG. 3 is a right side plan view of the container according to the present design.
Figure 4:
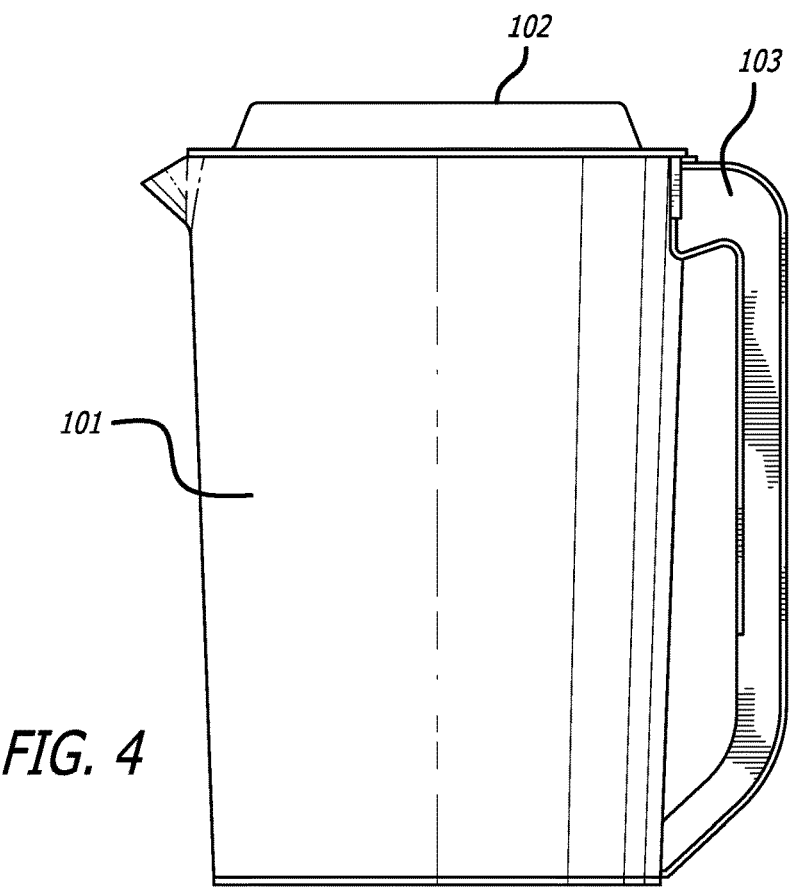
FIG. 4 is a left side plan view of the container according to the present design.
Figure 5:
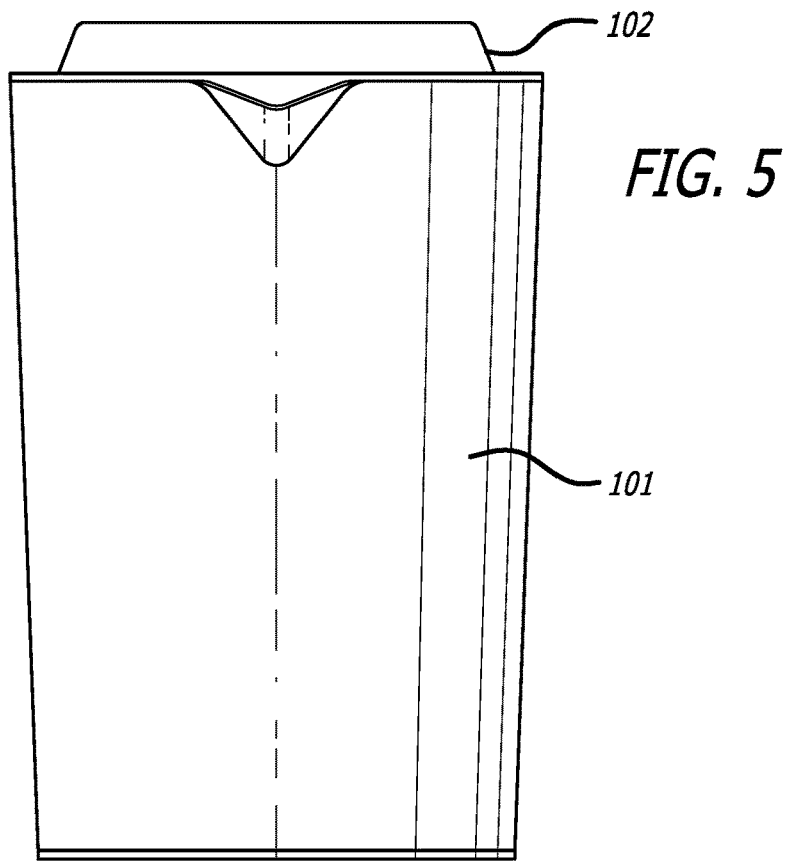
FIG. 5 is a front plan view of the container according to the present design.
Figure 6:
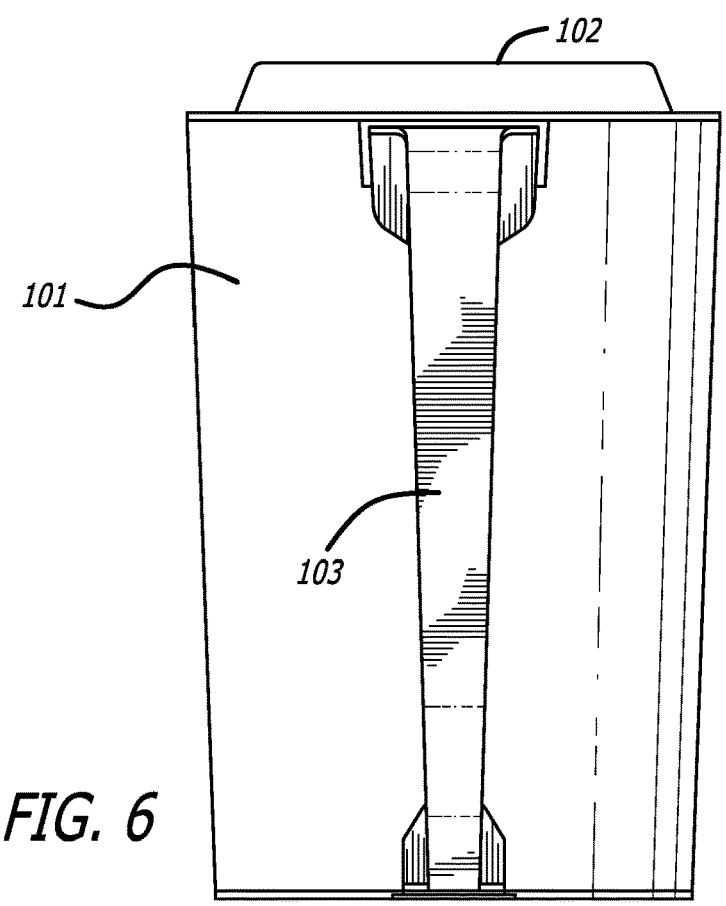
FIG. 6 is a rear plan view of the container according to the present design.
Figure 7:
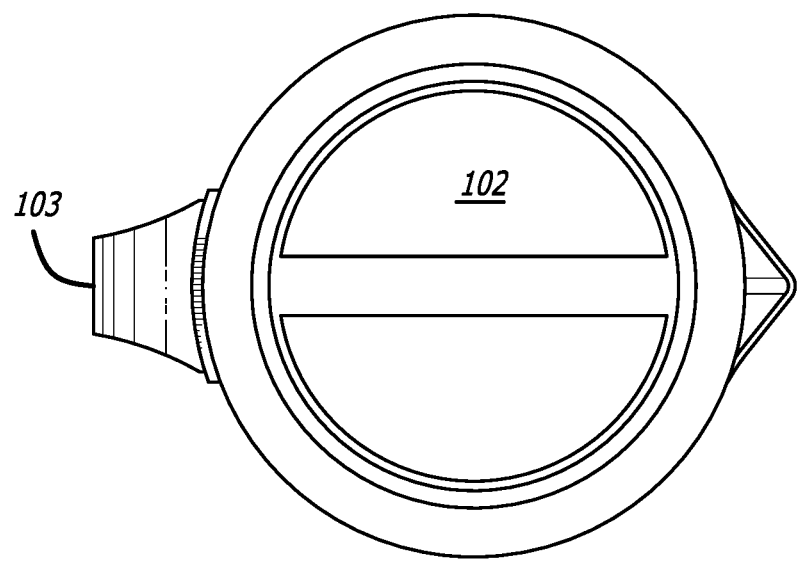
FIG. 7 is a top view of the container according to the present design.
Figure 8:
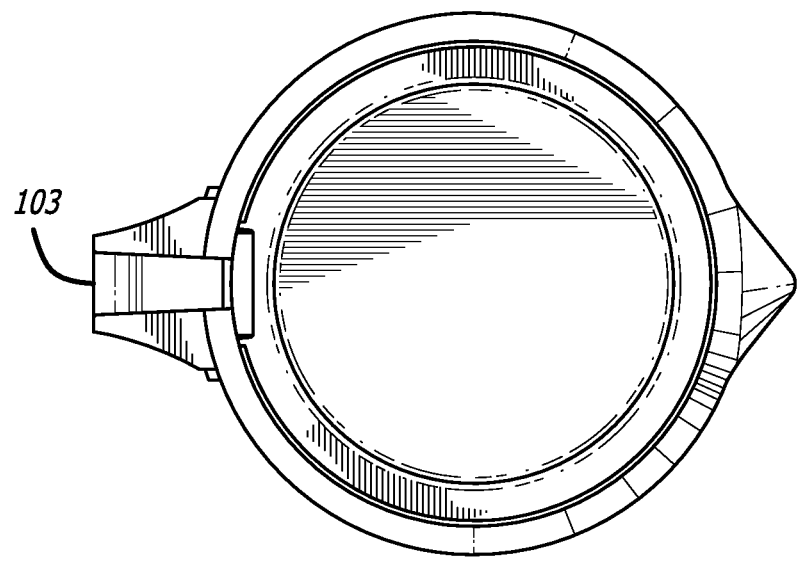
FIG. 8 is a bottom view of the container according to the present design.

FIG. 1 shows a typical container with handle prior to application of a graphic. From FIG. 1, pitcher 100 includes pitcher body 101, lid 102, handle 103, and a graphic 104 (not shown in this view). An alternate type of container may be provided having a container body. According to the design, the pitcher body 101 may be provided in a manner such as on a rotating element (with the central axis (not shown) of the pitcher body 101 oriented vertically) or in a lathe type device with the top secured (with the central axis of the pitcher body 101 oriented substantially horizontally, for example). The pitcher body 101 is initially provided without the lid 102 or handle 103. At this point, the graphic 104 may be manually applied, such as by placing a leading edge of the graphic on the pitcher body 101 lined up generally with the central axis of the pitcher. The pitcher body may be spun or rotated while the graphic 104 is gradually applied. The result is a pitcher body 101 with a graphic 104 applied beneath the handle 103.

While the term "graphic" is used herein, virtually any print or decal or element that substantially encircles the pitcher body may be employed, including a textual representation, disjoint series of representations, pieces forming an encircling graphic, a unitary piece comprising a single color, or other encircling design. Thus the term "graphic" as well as other terms, such as "container" "pitcher" "handle" and so forth are to be interpreted broadly, and such terminology is not intended to be limiting. Further, as discussed, alternate designs, such as a container with two handles, may also employ the inventive teachings provided herein. Further, while the container body in the present description is contemplated as being circular, a container body having any cross section may be provided—oval, square, rectangular, irregular, and so forth, while still within the teachings presented. In all circumstances, the graphic is provided substantially or completely about the periphery of the container.

Further, the use of the term "periphery" herein means the circumference of the object, such as the container. In one instance, a narrow element, such as a string, may be considered to cover the "periphery" of the container if it extends around the exterior circumference of the container, i.e. if the container is circularly shaped the string covers the exterior circumference of the circle. Thus the graphic in the present design need not cover the entirety or majority of the container, but may simply extend around the circumference, or substantially about the circumference of the container.

Application of the graphic may be performed by machine or by hand or by available application means. In one instance, the pitcher body 101 may be maintained in a relatively fixed position and the graphic applied in a circular manner In each aspect, the graphic is applied around the circumference of the container body or substantially around the container body. While not mandatory, one application of the graphic 104 may include an edge proximate a position where one handle is to be applied, i.e. an edge of graphic 104 close to or completely under the handle 103.

Once the graphic has been applied, handle 103 can be applied to the pitcher body 101. When both the handle 103 and the pitcher body 101 are constructed of plastic, the handle can be attached using any reasonably available plastic attachment methods, including providing an area on pitcher body 101, such as a partial indentation, to receive the top portion of the handle 103 and/or joining components such as prongs or protrusions that mate with receiving components on the pitcher body 101. Adhesive bonding may be employed to affix a plastic handle to a plastic pitcher body. For other materials, joining methods may be used, including but not limited to welding, mechanical fastening, and other types of bonding.

Additional views of an embodiment of the completed design are presented in FIGS. 2-8, showing various views of one embodiment of the present design.

Figure 9:
FIG. 9 is a rear perspective view of a container, from the top, with a graphic applied substantially or completely around the periphery of the container.

FIG. 9 illustrates the completed design with graphic and handle applied. Graphic 104 is shown on pitcher body 101 and beneath or substantially beneath handle 103. More than one graphic may be applied but in all cases the graphic is provided to a significant portion of the circumference of the pitcher body 101, in most cases in excess of 95 percent of the pitcher body.

Figure 10:
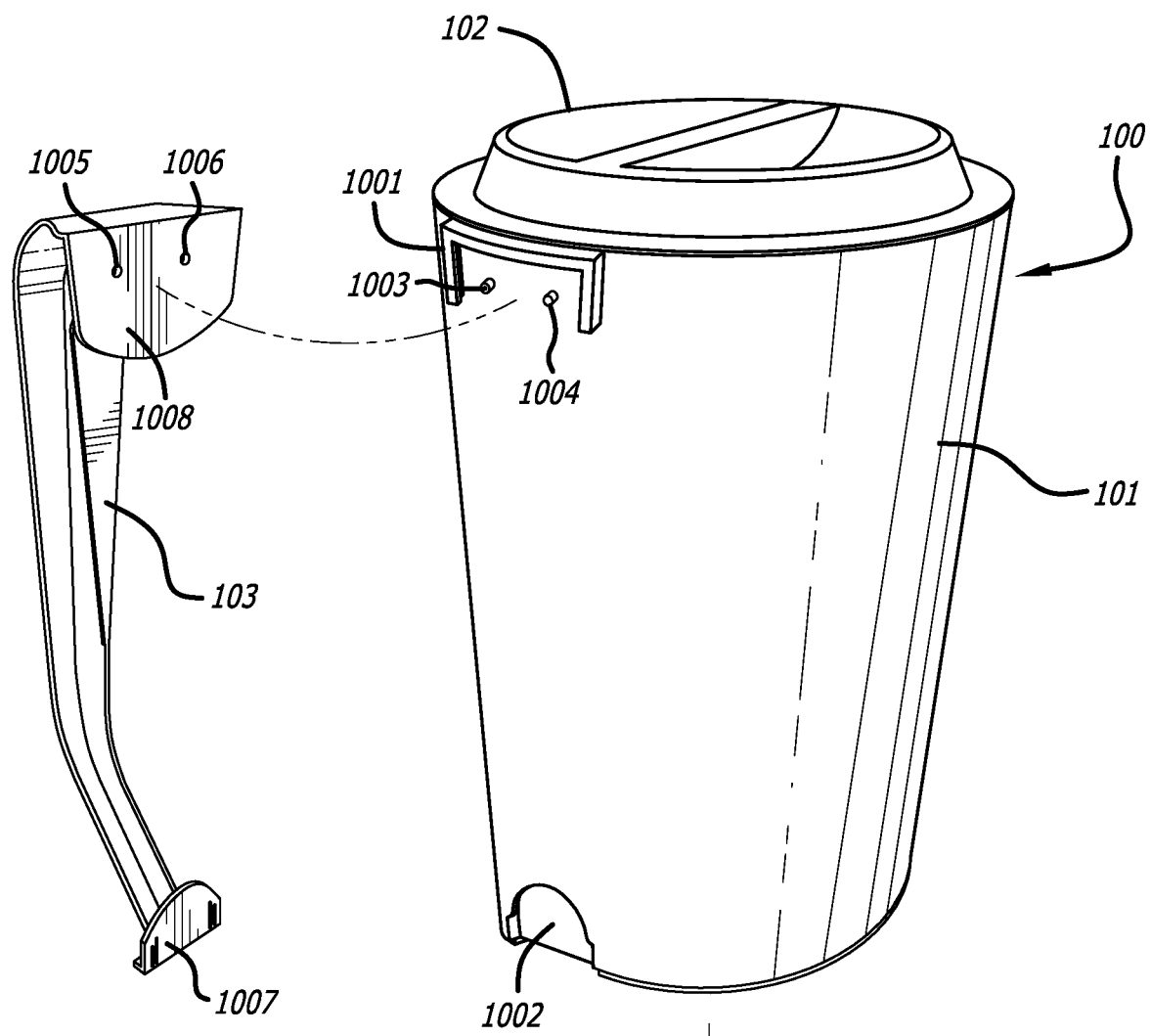
FIG. 10 is an exploded view of the container prior to assembly.
Figure 10:

FIG. 10 is an exploded view of one embodiment of the present design, wherein the pitcher body 101 includes two partially indented regions, upper indented region 1001 and lower indented region 1002. The handle 103 may include ends formed to be received in the partially indented regions 1001 and 1002. In this configuration, using the handle pictured, the lower end of the handle simply slides into the receiving lower indented region 1002, where the lower indented region 1002 in this embodiment takes the shape of an inverted horseshoe and the bottom portion 1007 of handle 103 fits therein. The handle top portion 1008 in this embodiment includes at least one opening and the upper indented region 1001 includes at least one mating "prong" configured to be received by the at least one opening. In one embodiment, two prongs 1003 and 1004 are provided on the pitcher body 101 with two openings 1005 and 1006 provided on handle 103. In this manner, the top of the handle 1007 can be affixed to the pitcher body 1001 using adhesive bonding, or any means known in the field.

Figure 11:
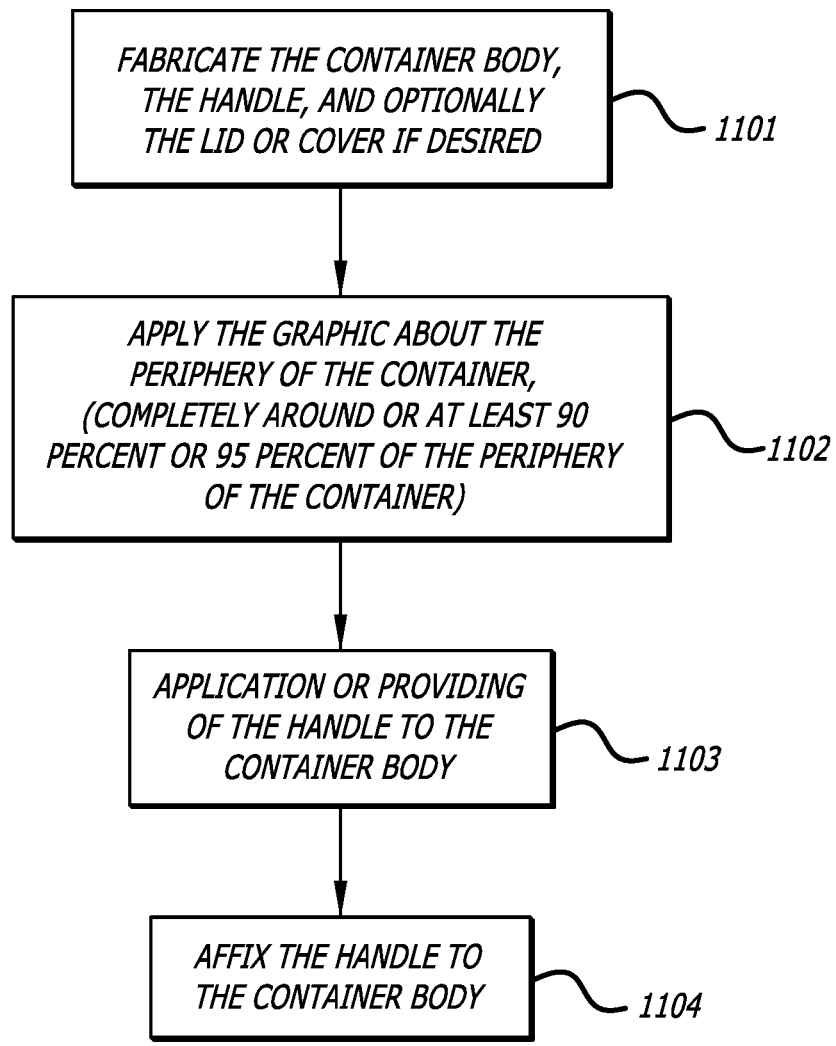
FIG. 11 is a flowchart of a method for providing a container with handle and graphic according to the present design.

FIG. 11 shows a general flowchart for a process for creating a container with encircling graphic. Point 1101 represents fabricating the container body, the handle, and optionally the lid or cover if desired. Point 1102 calls for applying the graphic about the periphery of the container, as noted completely around or at least 90 percent or 95 percent of the periphery of the container. As noted, this can be performed manually, using a lathe type device, or a rotating surface, or mechanically applying the graphic using an appropriate device, or using any other reasonable means available. Point 1103 is the application or providing of the handle to the container body, if one handle, or more than one handle if desired. Point 1104 calls for affixing the handle to the device, where affixation may include, in the case of plastics, adhesive bonding, use of mechanical fasteners, plastic welding, or other appropriate joining technique, and in the case of other materials joining techniques appropriate for the material. In virtually every situation, the handle will be fixedly mounted to the container body such that under normal use and circumstances the handle cannot be removed from the container body without damaging the handle and/or the container body.

Figure 12:
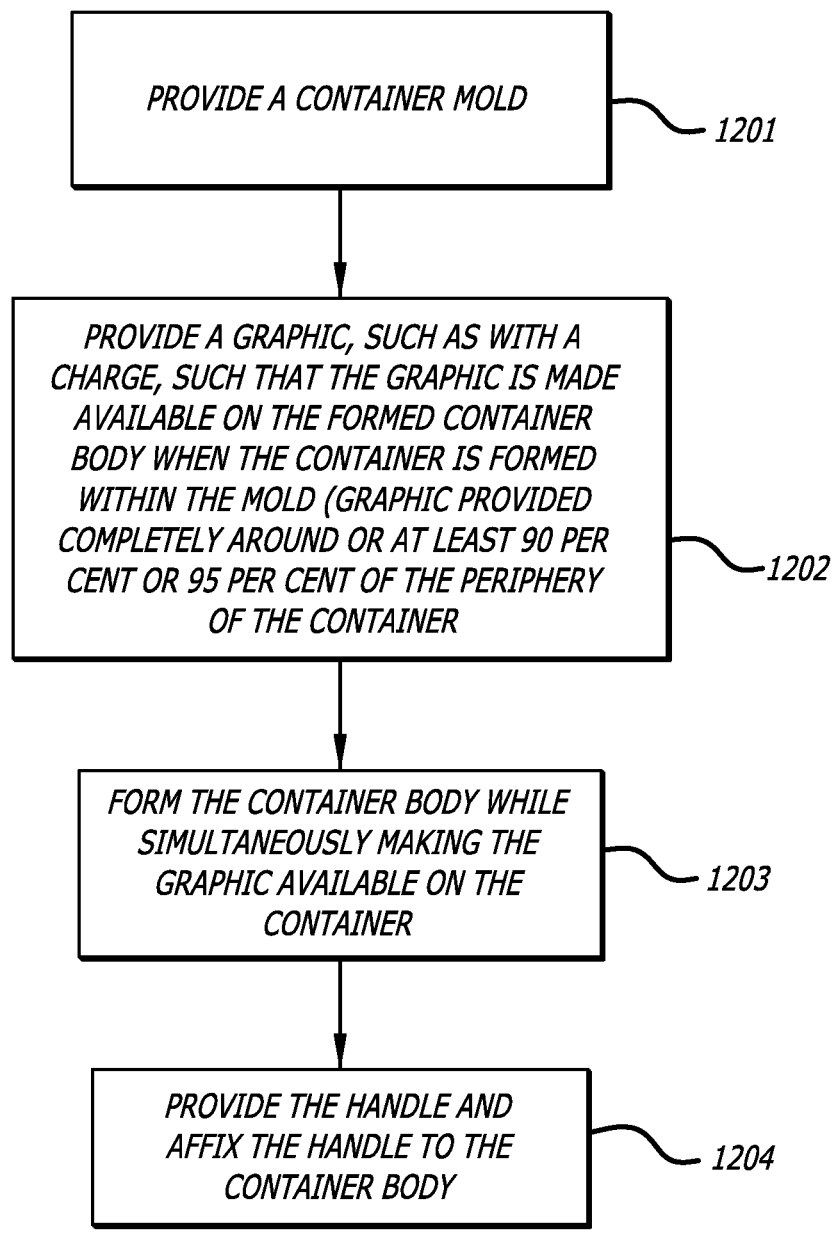
FIG. 12 is a flowchart of an alternate method for providing a container with handle and graphic according to the present design.

FIG. 12 is an alternate method for producing a container with handle with an encircling graphic, wherein the alternate method comprises in-mold labeling. At point 1201, a mold is provided. At point 1202, a graphic is provided with the mold, typically where the graphic is provided with an electrical charge. However, the graphic may be provided in other ways with the mold, including simply providing the encircling graphic in a neutral state encircling the body position in the mold, or with adhesive to facilitate joining of the graphic to the formed container body. Loading of the graphic may be provided by robot, by a human, or otherwise as known in the field. In other words, at point 1202, the graphic is provided, such as with a charge, such that the graphic is made available on the formed container body when the container is formed within the mold (graphic provided completely around or at least 90 percent or 95 percent of the periphery of the container). At point 1203, the container body is formed, typically by injecting material, such as heated liquid plastic, into the mold, forming the container body and causing the graphic to bond to the formed container body while in the mold. Point 1204 indicates the handle is provided and affixed to the formed container body by any reasonable means, including those disclosed herein and equivalents thereof.

Thus according to an embodiment of the present design, there is provided a process comprising fabricating a container body, providing a graphic about the periphery of the container body such that the graphic covers substantially all of the periphery of the container body, and fixedly mounting a handle to the container body after providing the graphic. In one aspect, fixedly mounting the handle to the container body comprises bonding at least one of a top portion of the handle and a bottom portion of the handle to the container body. The container body and handle may be formed of plastic. The container body may have a circular cross section through at least a portion of the container body. The graphic may cover over 95 percent of the periphery of the container body, and in one embodiment the container body comprises prongs configured to be received within holes in the handle and the handle is bonded to the container body using the prongs and holes. The container body may be formed with receiving elements configured to receive ends of the handle and in one embodiment may be configured to receive a plurality of handles.

According to another embodiment of the present design, there is provided a container produced by a process comprising fabricating a container body, fastening a graphic about the periphery of the container body such that the graphic covers substantially all of the periphery of the container body, wherein the periphery comprises at least a portion of an exterior boundary of the container body, and fixedly mounting a handle to the container body after fastening the graphic.

According to a further embodiment, there is provided a process for producing a container comprising fabricating a container body having a circular cross section while simultaneously fastening a graphic about the periphery of the container body such that the graphic covers over 95 percent of the periphery of the container body, and fixedly mounting a handle to the container body after fastening the graphic. The periphery of the container body comprises at least a portion of an exterior surface of the container body.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A process comprising:
    fabricating a container body having a peripheral surface comprising a peripheral vertically central section, wherein the container body comprises an upper protruding noncircumferential handle receptacle, and a lower indented noncircumferential handle receptacle configured to receive a handle;
    providing a graphic about the peripheral vertically central section of the container body such that the graphic covers all of the peripheral vertically central section of the container body; and
    fixedly mounting the handle to the container body with the upper protruding noncircumferential handle receptacle above and the lower indented noncircumferential handle receptacle below the graphic after providing the graphic;
    wherein the handle comprises a bottom portion having a curved upper edge configured to fit within a corresponding curved upper edge of the lower indented noncircumferential handle receptacle, and the container body is free of handle attachment points between the upper protruding noncircumferential handle receptacle and the lower indented noncircumferential handle receptacle.

2. The process of claim 1, wherein fixedly mounting the handle to the container body comprises bonding at least one of a top portion of the handle and a bottom portion of the handle to the container body.

3. The process of claim 2, wherein:
    the container body comprises prongs configured to be received within holes in the handle; and
    the handle is bonded to the container body using the prongs and holes.

4. The process of claim 1, wherein the container body and handle are formed of plastic.

5. The process of claim 1, wherein the container body has a circular cross section through at least a portion of the container body.

6. The process of claim 1, wherein the container body comprises a single solid uniformly formed piece.

7. The process of claim 1, wherein the container body is formed with receiving elements configured to receive ends of the handle.

8. The process of claim 1, wherein the container body further comprises a plurality of upper pins configured to receive holes formed in the handle.

9. A container produced by a process comprising:
    fabricating a container body having a peripheral surface comprising a peripheral vertically central section while simultaneously fastening a graphic about the peripheral vertically central section of the container body such that the graphic covers all of the peripheral vertically central section of the container body, wherein the container body comprises an upper protruding noncircumferential handle receptacle and a lower indented noncircumferential handle receptacle configured to receive a handle; and
    fixedly mounting the handle to the container body with the upper protruding noncircumferential handle receptacle above and the lower indented noncircumferential handle receptacle below the graphic after fastening the graphic;

wherein the handle comprises a bottom portion having a curved upper edge configured to fit within a corresponding curved upper edge of the lower indented noncircumferential handle receptacle, and the container body is free of handle attachment points between the upper protruding noncircumferential handle receptacle and the lower indented noncircumferential handle receptacle.

10. The container of claim 9, wherein fixedly mounting the handle to the container body comprises bonding at least one of a top portion of the handle and a bottom portion of the handle to the container body.

11. The container of claim 10, wherein:
the container body comprises prongs configured to be received within holes in the handle; and
the handle is bonded to the container body using the prongs and holes.

12. The container of claim 9, wherein the container body and handle are formed of plastic.

13. The container of claim 9, wherein the container body has a circular cross section through at least a portion of the container body.

14. The container of claim 9, wherein the container body further comprises a plurality of upper pins configured to receive holes formed in the handle.

15. The container of claim 9, wherein the container body is formed with receiving elements configured to receive ends of the handle.

16. A process for producing a container comprising:
fabricating a container body having a peripheral vertically central section, the container body formed with an upper protruding noncircumferential handle receptacle and a lower indented noncircumferential handle receptacle configured to receive a handle;

fastening a graphic about the peripheral vertically central section of the container body such that the graphic covers 100 percent of the peripheral vertically central section of the container body; and fixedly mounting the handle to the container body with the upper protruding noncircumferential handle receptacle above and the lower indented noncircumferential handle receptacle below the graphic after fastening the graphic;

wherein the handle comprises a bottom portion having a curved upper edge configured to fit within a corresponding curved upper edge of the lower indented noncircumferential handle receptacle, and the container body is free of handle attachment points between the upper protruding noncircumferential handle receptacle and the lower indented noncircumferential handle receptacle.

17. The process of claim 16, wherein fixedly mounting the handle to the container body comprises bonding at least one of a top portion of the handle and a bottom portion of the handle to the container body.

18. The process of claim 17, wherein the container body is formed with receiving elements configured to receive ends of the handle.

19. The process of claim 16, wherein the container body and handle are formed of plastic.

20. The process of claim 16, wherein:
the container body comprises prongs configured to be received within holes in the handle; and
the handle is bonded to the container body using the prongs and holes.

* * * * *